(12) United States Patent
Lin et al.

(10) Patent No.: US 8,333,018 B2
(45) Date of Patent: Dec. 18, 2012

(54) COMPOSITION FOR ENHANCING EVAPORATION OF SOLUTION AND METHOD THEREOF

(75) Inventors: Yung-Sheng Lin, Changhua County (TW); Ting-Kai Leung, Taipei (TW); Chien-Chung Chen, Taipei (TW); Jiann-Shiun Kao, Taipei (TW)

(73) Assignee: National Applied Research Laboratories, Taipei (TW)

( * ) Notice: Subject to any disclaimer, the term of this patent is extended or adjusted under 35 U.S.C. 154(b) by 517 days.

(21) Appl. No.: 12/710,374

(22) Filed: Feb. 23, 2010

(65) Prior Publication Data

US 2011/0168940 A1 Jul. 14, 2011

(30) Foreign Application Priority Data

Jan. 11, 2010 (TW) ............................ 99100616 A

(51) Int. Cl.
*F26B 11/00* (2006.01)

(52) U.S. Cl. ............... 34/253; 34/443; 34/105; 336/200; 385/11; 65/387; 219/701; 428/429; 106/287.14

(58) Field of Classification Search ............... 34/253, 34/256, 105, 201, 443, 282, 90; 252/67; 336/200; 385/11, 128; 65/387, 400; 428/477, 428/429; 106/287.14, 286.2; 219/701
See application file for complete search history.

(56) References Cited

U.S. PATENT DOCUMENTS

| | | | | |
|---|---|---|---|---|
| 3,704,523 A * | 12/1972 | Guerga et al. | .................. | 34/264 |
| 5,472,720 A * | 12/1995 | Rakhimov et al. | ............ | 426/241 |
| 5,707,911 A * | 1/1998 | Rakhimov et al. | ............ | 501/128 |
| 5,930,914 A * | 8/1999 | Johansson et al. | ............. | 34/273 |
| 6,626,987 B1 * | 9/2003 | Suzuki et al. | ............ | 106/287.14 |
| 7,208,229 B2 * | 4/2007 | Suzuki et al. | ................ | 428/447 |
| 2009/0077825 A1 * | 3/2009 | Toofan et al. | .................. | 34/273 |
| 2011/0168940 A1 * | 7/2011 | Lin et al. | ........................ | 252/67 |

FOREIGN PATENT DOCUMENTS

JP        2006052798 A   *   2/2006

* cited by examiner

Primary Examiner — Stephen M. Gravini
(74) Attorney, Agent, or Firm — WPAT, P.C.; Anthony King

(57) ABSTRACT

The present invention discloses a composition for enhancing evaporation of a solution and a method thereof. A far-infrared ray is released by a far-infrared releasing substance in the composition so as to induce evaporation of the solution. The far-infrared releasing substance may be ceramic minerals and mainly comprises 80~99.9 wt % of oxide minerals including 60~95 wt % of the aluminum oxide. The present invention can enhance evaporation of the solution by a simple physical method. Hence, the present invention not only promotes the application of the products but also reduces the pollutants generated by a chemical reaction, thereby achieving the object of protecting the environment from the pollution.

19 Claims, 4 Drawing Sheets

COMPOSITION FOR ENHANCING EVAPORATION OF SOLUTION AND METHOD THEREOF

FIELD OF THE INVENTION

The present invention relates to a composition for enhancing evaporation of a solution and a method thereof, and more particularly to a composition capable of irradiating a far-infrared ray with a specific wavelength to enhance evaporation of the solution and a method thereof.

BACKGROUND OF THE INVENTION

A far-infrared ray (FIR) is a kind of beneficial electromagnetic wave having a wavelength in the range of 4 to 400 μm. 90% of far-infrared rays have a wavelength between 4 and 14 μm and can help in the growth of animals and plants, so they have been called as the light of life by scientists. Far-infrared rays have three characteristics as following. First, the radioactivity, that is, a far-infrared ray can directly transmit to an object without using air as medium. Second, the high penetrating power, that is, a far-infrared ray can penetrate deeply into subcutaneous tissues, warm a human from inside the body, and activate the human cells. Third, the absorbability and the ability to generate resonance, that is, a far-infrared ray can be absorbed while penetrating through an object. Furthermore, a far-infrared ray can also result in the vibration of atoms and molecules. The vibration causes a reaction through resonant absorption. Therefore, far-infrared rays penetrating deeply into the human body can be induced under the skin to increase the temperature thereof, such that the capillaries are expanded so as to promote blood circulation. Furthermore, FIR has been proved to have many physiological activities and alleviative or therapeutic effects on human diseases, for example, enhanced metabolism, immune system activation, tissue regeneration, increased physiological oxidation-reduction reactions, balance of pH in the body, prevention of muscle soreness and relief of fatigue, etc.

Many staple products contain volatile solutions. If evaporation rates of the products are increased, i.e., the concentration of the molecules with the gas phase is increased, the application of the products can be promoted, for instance, increased redolent odors, improved mouth feeling of products, enhanced deodorization function, enhanced refreshing effect, improved production capacity, and the like. In addition to the above description in which the transportation of effective components is achieved by evaporation of a solution, similarly, in many processes for manufacturing staple products, the purpose of removing unwanted components can be achieved by enhanced evaporation of a solution. Currently, most conventional techniques for enhancing evaporation of a solution principally utilize an approach to raising temperature, further with the addition of a chemical substance to affect the evaporation of a solution. However, there are many disadvantages present in the above-described techniques, such as the problems of waste of energy, formation of chemical products, environmental pollution, harm to human health, and the like.

SUMMARY OF THE INVENTION

In view of the above-mentioned problems of the prior art, an object of the present invention is to provide a composition for enhancing evaporation of a solution and a method thereof, which utilize the energy of natural minerals to enhance evaporation of the solution at room temperature by a simple physical method. Hence, the present invention not only promotes the application of the products but also reduces environmental pollution.

According to the object of the present invention, there is provided a composition for enhancing evaporation of a solution, comprising a far-infrared releasing substance. The far-infrared releasing substance may consist of ceramic minerals and mainly comprises 80~99.9 wt % of oxide minerals. Furthermore, a far-infrared ray released by the far-infrared releasing substance can enhance the evaporation of the solution.

According to another object of the present invention, there is provided a method for enhancing evaporation of a solution, comprising steps as follows. A far-infrared releasing substance is provided. Then, the far-infrared releasing substance is placed at a distance close to a solution, at which a far-infrared ray acts on the solution, such that the far-infrared ray is released by the far-infrared releasing substance to enhance the evaporation of the solution at room temperature. The far-infrared releasing substance may be ceramic minerals and comprise 80~99.9 wt % of oxide minerals.

Moreover, the present invention provides usage of a far-infrared releasing substance. The far-infrared releasing substance can be used for enhancing evaporation of a solution at room temperature. The far-infrared releasing substance may be ceramic minerals and may comprise 80~99.9 wt % of oxide minerals.

As described above, the composition for enhancing evaporation of a solution and the method thereof according to the present invention may have one or more of the following advantages:

(1) The composition for enhancing evaporation of a solution and the method thereof according to the present invention, in which the far-infrared releasing substance is used as a source for irradiating far-infrared rays, can enhance the evaporation of the solution only by a simple physical method. Hence, the present invention not only reduces the pollutants generated by a chemical reaction but also reduces environmental pollution.

(2) The far-infrared releasing substance according to the present invention comprises minerals present in the nature and can enhance evaporation of a solution without the need of heating, namely, has high emissivity of the far infrared rays. Therefore, the far-infrared releasing substance not only continues to act on but also reduces the waste of energy.

(3) The composition for enhancing evaporation of a solution and the method thereof according to the present invention can promote the application of many staple products, for example, improvement in the combustion efficiency of petroleum to achieve the purpose of energy saving, enhanced effects of essential oil, and improved odors and mouth feelings of wine products.

DETAILED DESCRIPTION OF THE PREFERRED EMBODIMENTS

The present invention will be further described in more detail with reference to the following preferred examples and the accompanying drawings. It is to be noted that experimental data disclosed in the following examples are presented herein for explanation of the technical features of the present invention only; it is not intended to limit practical aspects of this invention.

Embodiment 1

Composition for Enhancing Evaporation of Solution

The composition for enhancing evaporation of a solution according to the present invention comprises a far-infrared releasing substance. A far-infrared ray is released by the far-infrared releasing substance so as to enhance the evaporation rates of the solution. The far-infrared releasing substance may be ceramic minerals, and its ingredients mainly comprise 80~99.9 wt % of oxide minerals and its other ingredients may include titanium boride, zinc hydroxide, carbide, and the like. The oxide minerals mainly comprise 60~95 wt % of aluminum oxide, and additionally, the rest of the oxide minerals includes titanium dioxide, magnesium oxide, silicon oxide, ferric oxide and zinc oxide. Furthermore, the carbide may be calcium carbide.

A form of the far-infrared releasing substance according to the present invention may comprise lump, granular, powdered, or thin-film form, and can irradiate a far-infrared ray at room temperature. The wavelength of the far-infrared ray is 4~30 μm, and preferably 8~14 μm. Furthermore, the emissivity of the far-infrared releasing substance, which is measured at room temperature by an FIR spectrometer using a blackbody emission as a standard, is greater than 0.9 at a wavelength of 8~14 μm. Moreover, the solution, whose evaporation can be enhanced according to the present invention, is a volatile solution, including essential oil, gasoline, or wine, etc.

Embodiment 2

Method for Enhancing Evaporation of Solution

Figure 1:
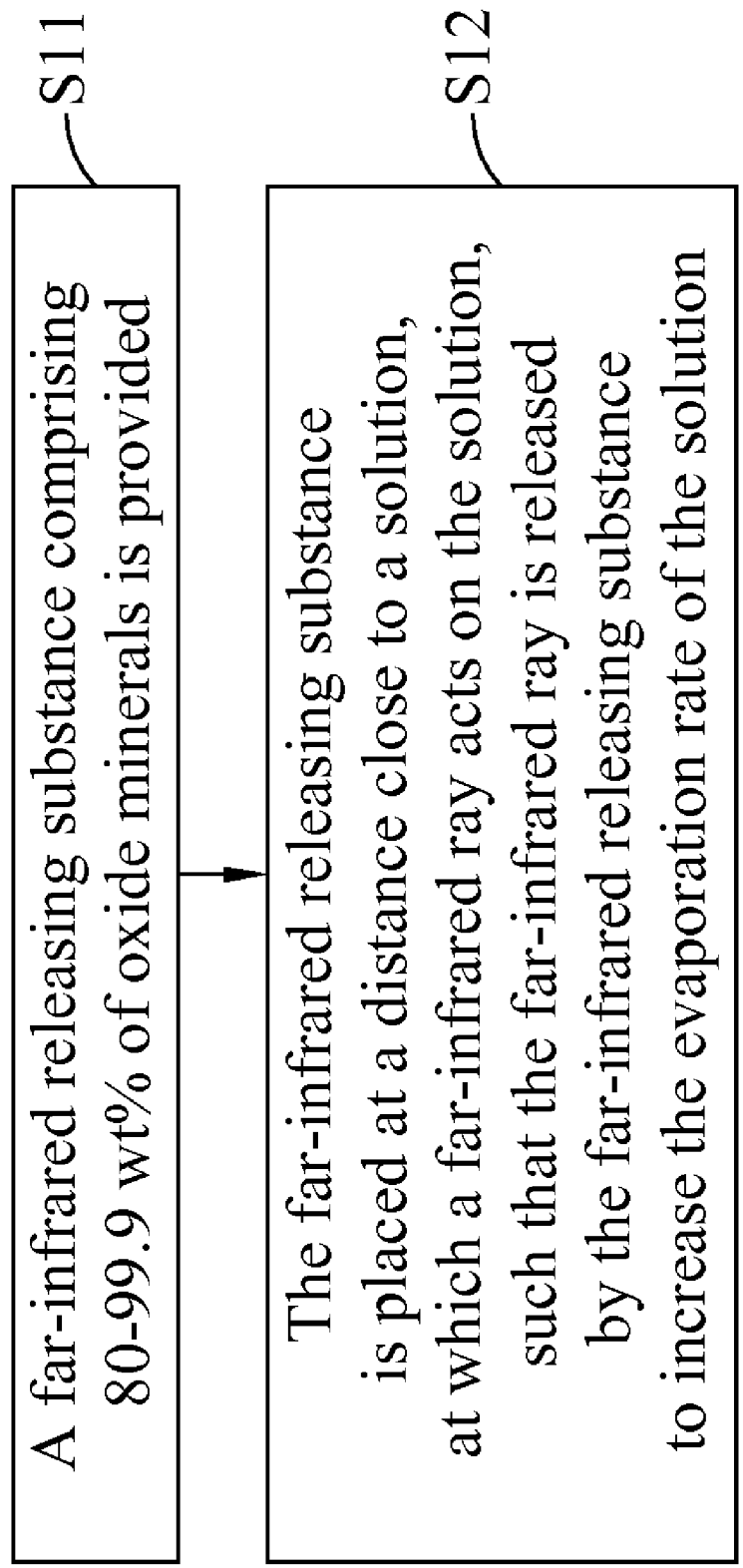
FIG. 1 is a flowchart illustrating a method for enhancing evaporation of a solution according to the present invention.

The method for enhancing evaporation of a solution according to the present invention, as illustrated in FIG. 1, comprises the following steps. In step S11, a far-infrared releasing substance comprising 80~99.9 wt % of oxide minerals is provided. In step S12, the far-infrared releasing substance is placed at a distance close to a solution, at which a far-infrared ray acts on the solution, such that the far-infrared ray is released by the far-infrared releasing substance to increase the evaporation rate of the solution. The far-infrared releasing substance may comprise ceramic minerals. In addition to 80~99.9 wt % of oxide minerals, the far-infrared releasing substance comprises other ingredients including non-oxide minerals such as titanium boride, zinc hydroxide, carbide, and the like. The oxide minerals mainly comprise 60~95 wt % of aluminum oxide, and the rest of the oxide minerals includes titanium dioxide, magnesium oxide, silicon oxide, ferric oxide and zinc oxide. Furthermore, the carbide may be calcium carbide. Moreover, other properties of the far-infrared releasing substance are the same as those described in embodiment 1 and therefore will not be explained herein. The solution, whose evaporation can be enhanced according to the present invention, is a volatile solution, including essential oil, gasoline, or wine, etc.

Embodiment 3

Effect of Far-Infrared Releasing Substance on Enhancing Evaporation of Gasoline, Essential Oil, and Kaoliang Wine (Sorghum Liquor)

The experimental groups for this experiment are divided into a control group and an experiment group. The experiment group is also referred to as the FIR group. The experimental steps are described as follows: 10 ml of the solution to be tested, which may be gasoline, essential oil, and Kaoliang wine, is taken into a closed vessel. Then, 20 g of the far-infrared releasing substance is placed in another closed vessel. The closed vessel containing the far-infrared releasing substance is placed under the solution to be tested. After 20 minutes, the sample is injected into a GC (gas chromatograph) via a closed syringe extended into the vessel to draw out the solution, such that the solution is vaporized from its liquid state to its gaseous state. The concentrations of the constituents with gas phase are determined. The above-described experimental method is termed solid phase micro extraction. Moreover, the solution to be tested in the control group is the same as gasoline, essential oil, and Kaoliang wine. The difference from the FIR group is that no far-infrared releasing substance is placed under the solution to be tested. The remaining experimental procedures and conditions are the same as those of the FIR group and therefore not be repeated herein.

Figure 2:
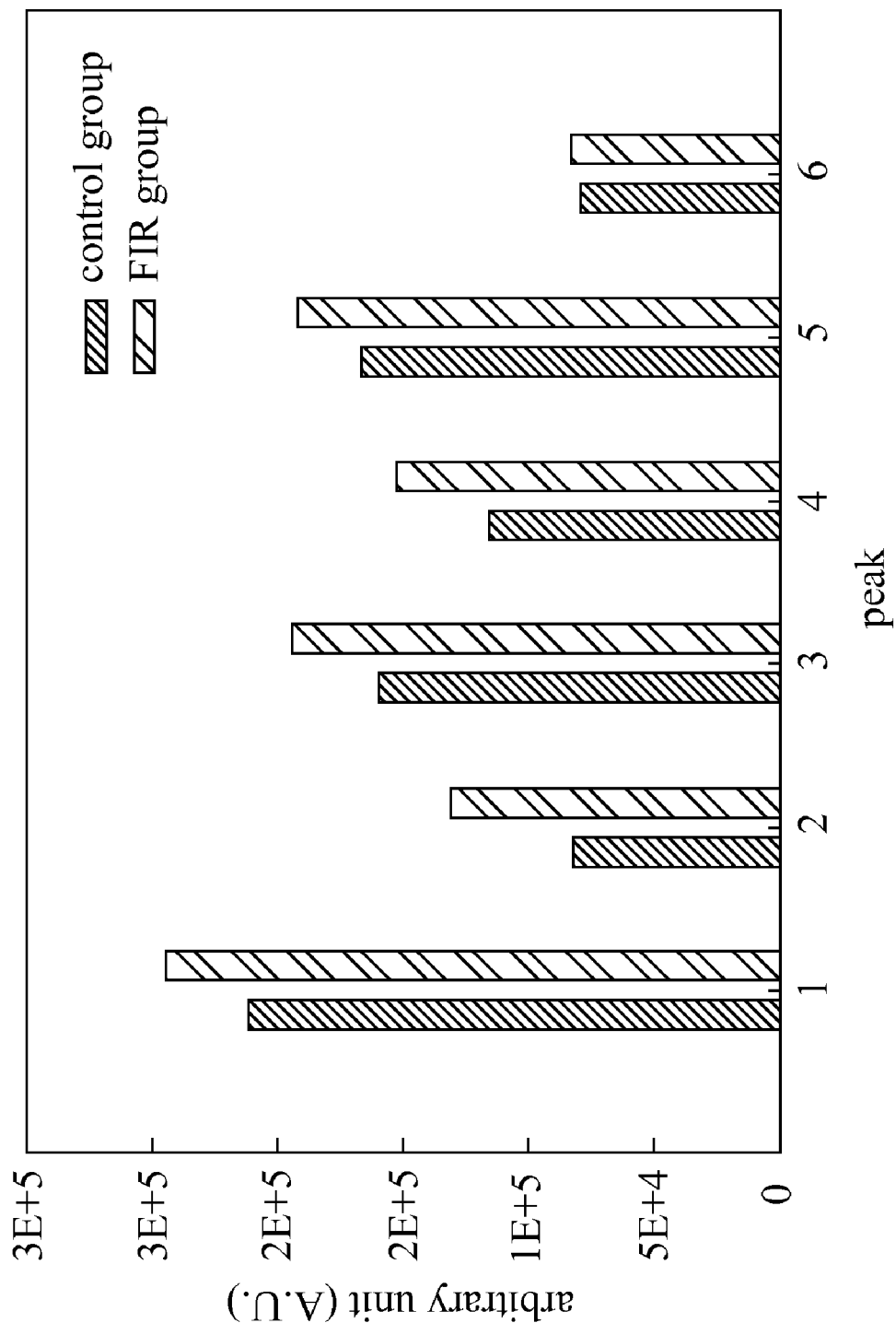
FIG. 2 is a bar chart illustrating the effect of a far-infrared releasing substance according to the present invention on the evaporation rate of gasoline.
Figure 3:
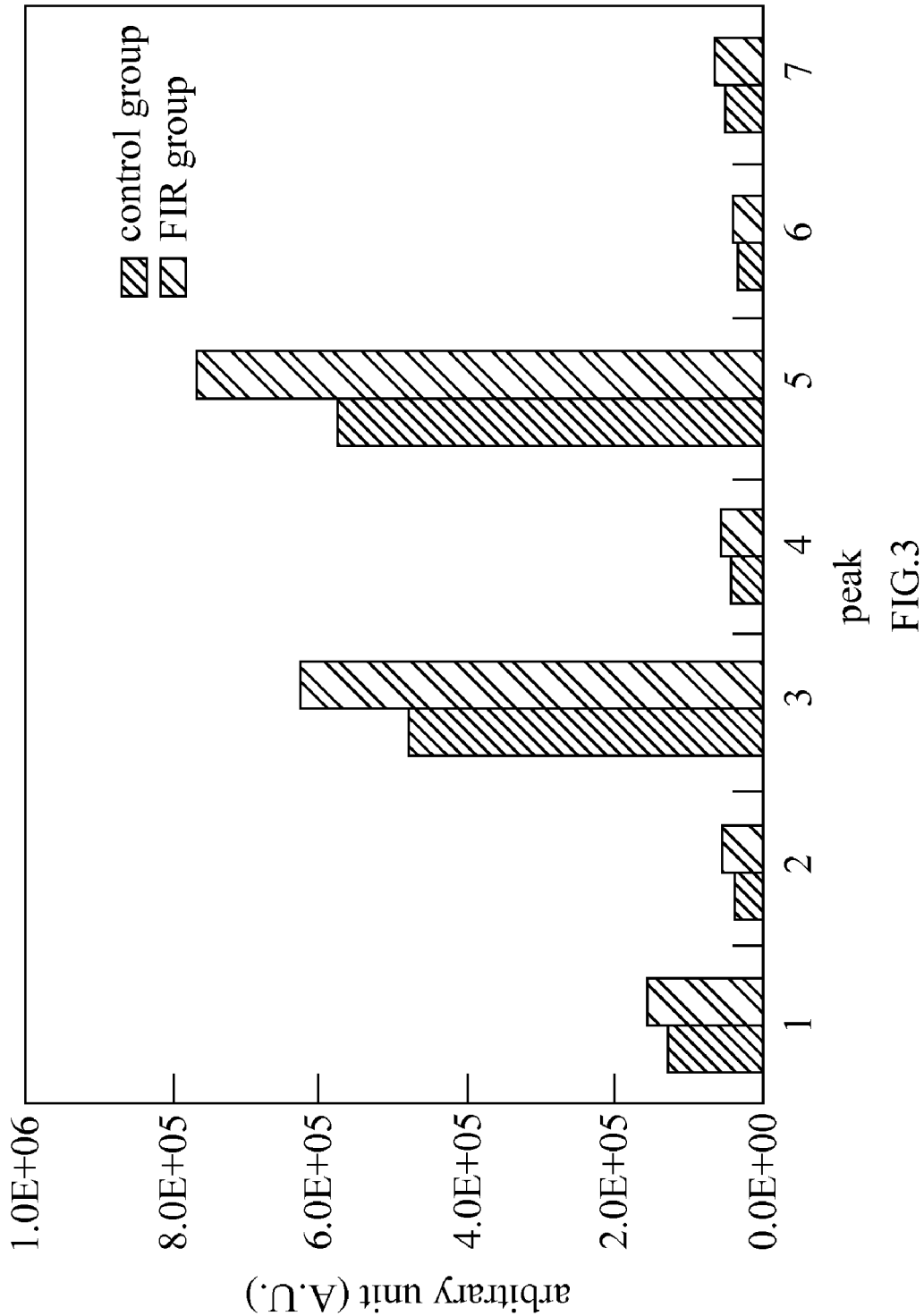
FIG. 3 is a bar chart illustrating the effect of a far-infrared releasing substance according to the present invention on the evaporation rate of essential oil.
Figure 4:
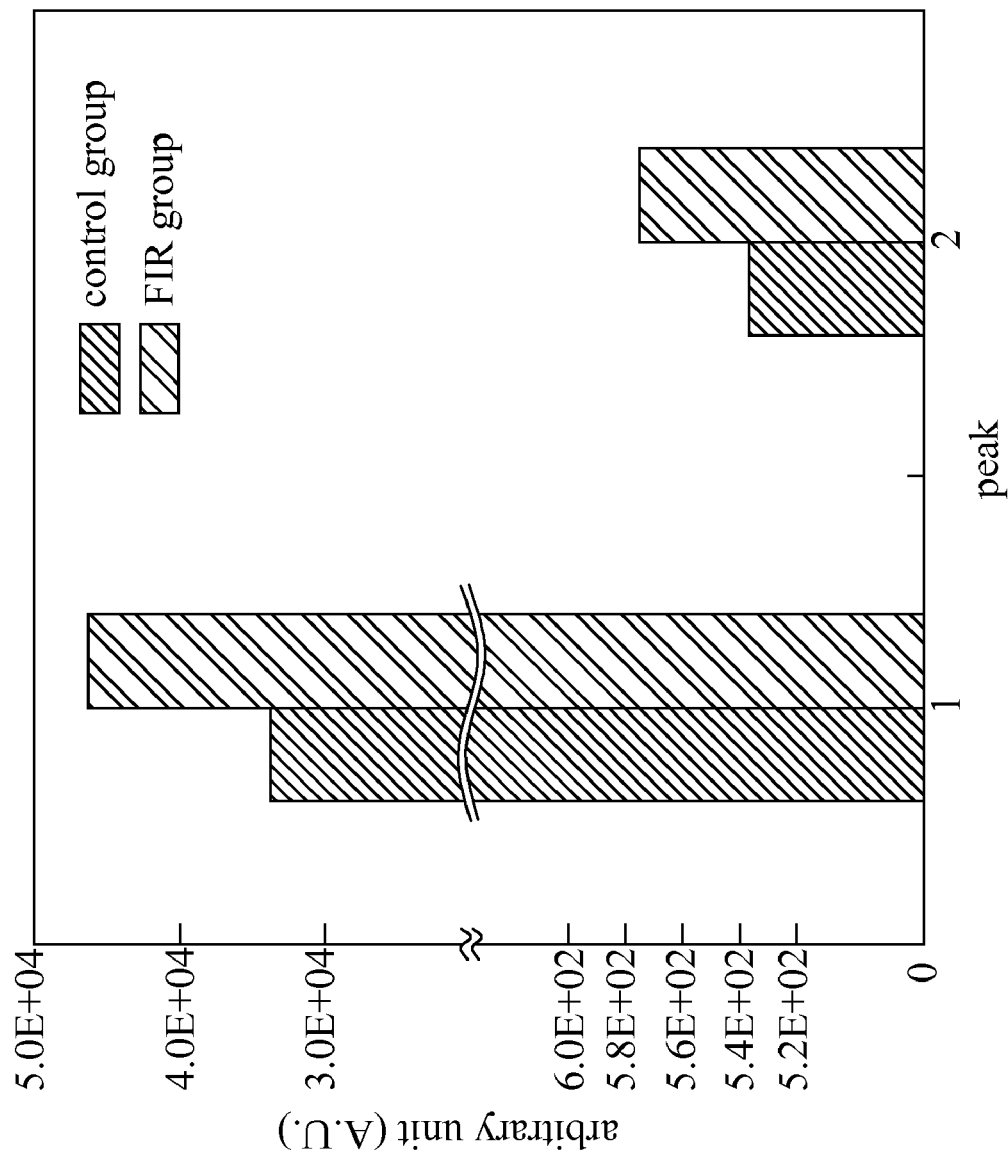
FIG. 4 is a bar chart illustrating the effect of a far-infrared releasing substance according to the present invention on the evaporation rate of Kaoliang wine.

Please refer to FIG. 2 that is a bar chart illustrating the effect of a far-infrared releasing substance according to the present invention on the evaporation rate of gasoline. As shown, the concentration of the molecules of gasoline with the gas phase is measured by gas chromatograph. As can be seen from the results in the FIG. 2, the concentration value of the molecules with the gas phase in the FIR group is much higher than that in the control group. It is demonstrated that the far-infrared releasing substance has a benefic effect on the evaporation rate of gasoline. Additionally, please refer to FIG. 3, there is a bar chart illustrating the effect of a far-infrared releasing substance according to the present invention on the evaporation rate of essential oil. As can be seen from the results in the FIG. 3, the concentration value of the molecules with the gas phase in the FIR group is much higher than that in the control group. It is demonstrated that the far-infrared releasing substance has a good effect on the evaporation rate of essential oil. The effect of a far-infrared releasing substance according to the present invention on the evaporation rate of Kaoliang wine is as illustrated in FIG. 4, wherein the peak 1 represents the ethanol which has the highest content of the Kaoliang wine, and the peak 2 represents the component which has the second highest content of the Kaoliang wine. As can be seen from FIG. 4, the concentration value of the molecules with the gas phase in the FIR group is much higher than that in the control group. It is demonstrated that the far-infrared releasing substance also has a good effect on the evaporation rate of Kaoliang wine. As concluded from the above-described results, it is clearly recognized that the far-infrared releasing substance can effectively enhance evaporation of a volatile solution.

The above description is illustrative only and is not to be considered limiting. Various modifications or changes can be made without departing from the spirit and scope of the invention. All such equivalent modifications and changes shall be included within the scope of the appended claims.

What is claimed is:

1. A composition for enhancing evaporation of a solution, comprising:
   a far-infrared releasing substance being a ceramic mineral and comprising 80~99.9 wt % of oxide minerals;
   wherein a far-infrared ray is released by the far-infrared releasing substance to enhance evaporation of the solution.

2. The composition for enhancing evaporation of the solution as set forth in claim 1, wherein the oxide minerals comprise 60~95 wt % of aluminum oxide.

3. The composition for enhancing evaporation of the solution as set forth in claim 2, wherein the oxide minerals further comprise titanium dioxide, magnesium oxide, silicon oxide, ferric oxide or zinc oxide.

4. The composition for enhancing evaporation of the solution as set forth in claim 1, wherein the far-infrared releasing substance further comprises titanium boride, zinc hydroxide or carbide.

5. The composition for enhancing evaporation of the solution as set forth in claim 4, wherein the carbide is calcium carbide.

6. The composition for enhancing evaporation of the solution as set forth in claim 1, wherein a form of the composition comprises lump, granular, powdered, or thin-film form.

7. The composition for enhancing evaporation of the solution as set forth in claim 1, wherein the far-infrared releasing substance irradiates the far-infrared ray at room temperature.

8. The composition for enhancing evaporation of the solution as set forth in claim 7, wherein a wavelength of the far-infrared ray is 5~30 µm.

9. The composition for enhancing evaporation of the solution as set forth in claim 8, wherein the wavelength of the far-infrared ray is 8~14 µm.

10. The composition for enhancing evaporation of the solution as set forth in claim 1, wherein the solution is a volatile solution.

11. A method for enhancing evaporation of a solution, comprising:
    providing a far-infrared releasing substance; and
    placing the far-infrared releasing substance at a distance close to a solution, wherein, at the solution, a far-infrared ray acts thereon, and the far-infrared ray is released by the far-infrared releasing substance to enhance evaporation of the solution;
    wherein the far-infrared releasing substance is a ceramic mineral and comprises 80~99.9 wt % of oxide minerals.

12. The method for enhancing evaporation of the solution as set forth in claim 11, wherein the oxide minerals comprise 60~95 wt % of aluminum oxide.

13. The method for enhancing evaporation of the solution as set forth in claim 12, wherein the oxide minerals further comprise titanium dioxide, magnesium oxide, silicon oxide, ferric oxide or zinc oxide.

14. The method for enhancing evaporation of the solution as set forth in claim 11, wherein the far-infrared releasing substance further comprises titanium boride, zinc hydroxide or carbide.

15. The method for enhancing evaporation of the solution as set forth in claim 14, wherein the carbide is calcium carbide.

16. The method for enhancing evaporation of the solution as set forth in claim 11, wherein a form of the composition comprises lump, granular, powdered, or thin-film form.

17. The method for enhancing evaporation of the solution as set forth in claim 11, wherein the far-infrared releasing substance irradiates the far-infrared ray at room temperature.

18. The method for enhancing evaporation of the solution as set forth in claim 17, wherein a wavelength of the far-infrared ray is 5~30 µm.

19. The method for enhancing evaporation of the solution as set forth in claim 18, wherein the wavelength of the far-infrared ray is 8~14 µm.

* * * * *

UNITED STATES PATENT AND TRADEMARK OFFICE
CERTIFICATE OF CORRECTION

PATENT NO. : 8,333,018 B2
APPLICATION NO. : 12/710374
DATED : December 18, 2012
INVENTOR(S) : Lin et al.

It is certified that error appears in the above-identified patent and that said Letters Patent is hereby corrected as shown below:

Title Page, Item (73), Column 1,
"National Applied Research Laboratories   Taipei (TW)" should read – National Applied Research Laboratories   Taipei City (TW) and Taipei Medical University   Taipei City (TW).

Signed and Sealed this
Eleventh Day of June, 2013

Teresa Stanek Rea
*Acting Director of the United States Patent and Trademark Office*